(12) United States Patent
Wu et al.

(10) Patent No.: US 7,929,161 B2
(45) Date of Patent: Apr. 19, 2011

(54) IMAGE PROCESSING SYSTEM AND METHOD

(75) Inventors: Yifeng Wu, Vancouver, WA (US); Kevin R. Hudson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2134 days.

(21) Appl. No.: 10/825,452

(22) Filed: Apr. 15, 2004

(65) Prior Publication Data

US 2005/0231751 A1    Oct. 20, 2005

(51) Int. Cl.
*G06F 3/12* (2006.01)
*G06K 9/00* (2006.01)

(52) U.S. Cl. ......... 358/1.15; 358/1.1; 382/170; 382/168
(58) Field of Classification Search .................. None
See application file for complete search history.

(56) References Cited

U.S. PATENT DOCUMENTS

| | | | |
|---|---|---|---|
| 6,185,335 B1 * | 2/2001 | Karidi et al. | 382/224 |
| 6,320,981 B1 * | 11/2001 | Yada | 382/168 |
| 6,671,402 B1 * | 12/2003 | Pass et al. | 382/170 |
| 6,714,677 B1 * | 3/2004 | Stearns et al. | 382/181 |
| 7,110,591 B2 * | 9/2006 | Neubauer et al. | 382/147 |
| 7,301,677 B2 * | 11/2007 | Oyumi | 358/3.28 |
| 7,304,761 B2 * | 12/2007 | Enomoto | 358/1.15 |
| 2004/0001632 A1 * | 1/2004 | Adachi | 382/224 |

OTHER PUBLICATIONS

Greg Pass et al., "Comparing Images Using Joint Histograms," Published ACM Journal of Multimedia Systems, 7(3), May 1999, pp. 234-240.
Annalisa Barla et al., "Histogram Intersection Kernel for Image Classification," Published Proc. of International Conference on Image Processing (ICIP03), Barcelona, Sep. 2003, 4 pgs.
Michael J. Swain et al., "Color Indexing," International Journal of Computer Vision, 7:1, 11-32 (1991), pp. 1-20.
Wikipedia, "Color Histogram," 1 page, retrieved from the Internet at http://en.wikipedia.org/wiki/Color_histogram.

* cited by examiner

*Primary Examiner* — Edward L Coles
*Assistant Examiner* — Marcus T Riley

(57) ABSTRACT

A printing control system includes a plurality of printing units, an image source, and a system processing unit. The image source provides a print job comprising a plurality of images to the system processing unit. The system processing unit receives the plurality of images in the print job from the image source, and calculates an image histogram for each image in the print job. The system processing unit then determines the similarity of the images in the print job by comparing the calculated histograms. The system processing unit then classifies the images into classes based on the comparison, and sends the classes of images to the printing units.

39 Claims, 5 Drawing Sheets

|  | $I_1$ | $I_2$ | $I_3$ | $I_4$ | $I_5$ | $I_6$ | $I_7$ | $I_8$ | $I_9$ | $I_{10}$ | $I_{11}$ | $I_{12}$ | $I_{13}$ | $I_{14}$ | $I_{15}$ | $I_{16}$ | $I_{17}$ |
|---|---|---|---|---|---|---|---|---|---|---|---|---|---|---|---|---|---|
| $I_1$ | 1.000 | 0.862 | 0.317 | 0.177 | 0.413 | 0.302 | 0.456 | 0.434 | 0.398 | 0.402 | 0.413 | 0.150 | 0.135 | 0.175 | 0.297 | 0.270 | 0.206 |
| $I_2$ | 0.862 | 1.000 | 0.252 | 0.136 | 0.218 | 0.156 | 0.252 | 0.263 | 0.187 | 0.191 | 0.227 | 0.078 | 0.081 | 0.101 | 0.181 | 0.162 | 0.114 |
| $I_3$ | 0.317 | 0.252 | 1.000 | 0.396 | 0.457 | 0.477 | 0.583 | 0.500 | 0.376 | 0.293 | 0.467 | 0.093 | 0.112 | 0.186 | 0.353 | 0.533 | 0.132 |
| $I_4$ | 0.177 | 0.136 | 0.396 | 1.000 | 0.252 | 0.529 | 0.354 | 0.289 | 0.213 | 0.193 | 0.277 | 0.065 | 0.078 | 0.126 | 0.237 | 0.335 | 0.088 |
| $I_5$ | 0.413 | 0.218 | 0.457 | 0.252 | 1.000 | 0.633 | 0.847 | 0.873 | 0.848 | 0.803 | 0.860 | 0.315 | 0.342 | 0.466 | 0.510 | 0.385 | 0.406 |
| $I_6$ | 0.302 | 0.156 | 0.477 | 0.529 | 0.633 | 1.000 | 0.692 | 0.536 | 0.415 | 0.399 | 0.436 | 0.440 | 0.303 | 0.342 | 0.544 | 0.602 | 0.448 |
| $I_7$ | 0.456 | 0.252 | 0.583 | 0.354 | 0.847 | 0.692 | 1.000 | 0.789 | 0.743 | 0.716 | 0.789 | 0.429 | 0.360 | 0.445 | 0.670 | 0.600 | 0.479 |
| $I_8$ | 0.434 | 0.263 | 0.500 | 0.289 | 0.873 | 0.536 | 0.789 | 1.000 | 0.856 | 0.766 | 0.886 | 0.244 | 0.262 | 0.375 | 0.419 | 0.394 | 0.341 |
| $I_9$ | 0.398 | 0.187 | 0.376 | 0.213 | 0.848 | 0.415 | 0.743 | 0.856 | 1.000 | 0.957 | 0.910 | 0.227 | 0.227 | 0.349 | 0.369 | 0.315 | 0.324 |
| $I_{10}$ | 0.402 | 0.191 | 0.293 | 0.193 | 0.803 | 0.399 | 0.716 | 0.766 | 0.957 | 1.000 | 0.851 | 0.319 | 0.288 | 0.403 | 0.444 | 0.330 | 0.426 |
| $I_{11}$ | 0.413 | 0.227 | 0.467 | 0.277 | 0.860 | 0.436 | 0.789 | 0.886 | 0.910 | 0.851 | 1.000 | 0.191 | 0.242 | 0.366 | 0.441 | 0.310 | 0.300 |
| $I_{12}$ | 0.150 | 0.078 | 0.093 | 0.065 | 0.315 | 0.440 | 0.429 | 0.244 | 0.227 | 0.319 | 0.191 | 1.000 | 0.535 | 0.589 | 0.762 | 0.527 | 0.957 |
| $I_{13}$ | 0.135 | 0.081 | 0.112 | 0.078 | 0.342 | 0.303 | 0.360 | 0.262 | 0.227 | 0.288 | 0.242 | 0.535 | 1.000 | 0.957 | 0.576 | 0.294 | 0.608 |
| $I_{14}$ | 0.175 | 0.101 | 0.186 | 0.126 | 0.466 | 0.342 | 0.445 | 0.375 | 0.349 | 0.403 | 0.366 | 0.589 | 0.957 | 1.000 | 0.618 | 0.315 | 0.685 |
| $I_{15}$ | 0.297 | 0.181 | 0.353 | 0.237 | 0.510 | 0.544 | 0.670 | 0.419 | 0.369 | 0.444 | 0.441 | 0.762 | 0.576 | 0.618 | 1.000 | 0.736 | 0.769 |
| $I_{16}$ | 0.270 | 0.162 | 0.533 | 0.335 | 0.385 | 0.602 | 0.600 | 0.394 | 0.315 | 0.330 | 0.310 | 0.527 | 0.294 | 0.315 | 0.736 | 1.000 | 0.478 |
| $I_{17}$ | 0.206 | 0.114 | 0.132 | 0.088 | 0.406 | 0.448 | 0.479 | 0.341 | 0.324 | 0.426 | 0.300 | 0.957 | 0.608 | 0.685 | 0.769 | 0.478 | 1.000 |
| $I_{18}$ | 0.272 | 0.142 | 0.305 | 0.176 | 0.644 | 0.432 | 0.615 | 0.570 | 0.604 | 0.647 | 0.556 | 0.703 | 0.701 | 0.835 | 0.703 | 0.499 | 0.804 |
| $I_{19}$ | 0.237 | 0.138 | 0.357 | 0.494 | 0.500 | 0.661 | 0.590 | 0.496 | 0.388 | 0.375 | 0.402 | 0.450 | 0.342 | 0.393 | 0.554 | 0.566 | 0.464 |
| $I_{20}$ | 0.247 | 0.146 | 0.360 | 0.460 | 0.524 | 0.669 | 0.590 | 0.511 | 0.425 | 0.436 | 0.433 | 0.549 | 0.426 | 0.491 | 0.581 | 0.531 | 0.586 |
| $I_{21}$ | 0.115 | 0.050 | 0.097 | 0.030 | 0.402 | 0.372 | 0.391 | 0.303 | 0.299 | 0.351 | 0.281 | 0.892 | 0.525 | 0.639 | 0.574 | 0.261 | 0.907 |
| $I_{22}$ | 0.142 | 0.070 | 0.166 | 0.048 | 0.498 | 0.341 | 0.438 | 0.395 | 0.377 | 0.397 | 0.399 | 0.779 | 0.601 | 0.737 | 0.544 | 0.215 | 0.836 |
| $I_{23}$ | 0.249 | 0.146 | 0.322 | 0.135 | 0.658 | 0.202 | 0.544 | 0.614 | 0.553 | 0.479 | 0.655 | 0.181 | 0.292 | 0.462 | 0.298 | 0.122 | 0.304 |
| $I_{24}$ | 0.121 | 0.060 | 0.122 | 0.044 | 0.415 | 0.351 | 0.382 | 0.330 | 0.310 | 0.364 | 0.317 | 0.841 | 0.558 | 0.686 | 0.540 | 0.218 | 0.893 |
| $I_{25}$ | 0.211 | 0.096 | 0.265 | 0.075 | 0.643 | 0.145 | 0.480 | 0.572 | 0.639 | 0.556 | 0.630 | 0.123 | 0.187 | 0.363 | 0.189 | 0.062 | 0.221 |
| $I_{26}$ | 0.194 | 0.074 | 0.242 | 0.048 | 0.659 | 0.138 | 0.465 | 0.562 | 0.693 | 0.616 | 0.625 | 0.152 | 0.205 | 0.386 | 0.177 | 0.042 | 0.246 |
| $I_{27}$ | 0.175 | 0.065 | 0.234 | 0.032 | 0.631 | 0.126 | 0.429 | 0.541 | 0.641 | 0.549 | 0.586 | 0.139 | 0.197 | 0.378 | 0.157 | 0.037 | 0.229 |
| $I_{28}$ | 0.180 | 0.065 | 0.233 | 0.034 | 0.639 | 0.121 | 0.437 | 0.546 | 0.662 | 0.571 | 0.596 | 0.120 | 0.170 | 0.351 | 0.147 | 0.034 | 0.208 |
| $I_{29}$ | 0.166 | 0.194 | 0.193 | 0.082 | 0.065 | 0.052 | 0.065 | 0.109 | 0.074 | 0.071 | 0.079 | 0.021 | 0.025 | 0.029 | 0.068 | 0.067 | 0.034 |
| $I_{30}$ | 0.166 | 0.207 | 0.216 | 0.081 | 0.051 | 0.042 | 0.056 | 0.095 | 0.032 | 0.026 | 0.042 | 0.007 | 0.014 | 0.015 | 0.035 | 0.032 | 0.014 |
| $I_{31}$ | 0.430 | 0.284 | 0.594 | 0.416 | 0.769 | 0.595 | 0.861 | 0.821 | 0.633 | 0.554 | 0.781 | 0.294 | 0.327 | 0.420 | 0.558 | 0.468 | 0.379 |
| $I_{32}$ | 0.279 | 0.166 | 0.477 | 0.233 | 0.724 | 0.316 | 0.673 | 0.619 | 0.625 | 0.577 | 0.742 | 0.290 | 0.353 | 0.527 | 0.443 | 0.261 | 0.402 |
| $I_{33}$ | 0.333 | 0.211 | 0.215 | 0.188 | 0.319 | 0.300 | 0.427 | 0.399 | 0.353 | 0.425 | 0.349 | 0.312 | 0.274 | 0.278 | 0.606 | 0.640 | 0.365 |
| $I_{34}$ | 0.139 | 0.027 | 0.010 | 0.005 | 0.335 | 0.306 | 0.162 | 0.128 | 0.212 | 0.232 | 0.165 | 0.013 | 0.010 | 0.028 | 0.083 | 0.035 | 0.047 |
| $I_{35}$ | 0.209 | 0.067 | 0.011 | 0.005 | 0.298 | 0.286 | 0.231 | 0.128 | 0.242 | 0.309 | 0.170 | 0.145 | 0.130 | 0.148 | 0.305 | 0.244 | 0.188 |

Fig. 4A

| $I_{18}$ | $I_{19}$ | $I_{20}$ | $I_{21}$ | $I_{22}$ | $I_{23}$ | $I_{24}$ | $I_{25}$ | $I_{26}$ | $I_{27}$ | $I_{28}$ | $I_{29}$ | $I_{30}$ | $I_{31}$ | $I_{32}$ | $I_{33}$ | $I_{34}$ | $I_{35}$ | |
|---|---|---|---|---|---|---|---|---|---|---|---|---|---|---|---|---|---|---|
| 0.272 | 0.237 | 0.247 | 0.115 | 0.142 | 0.249 | 0.121 | 0.211 | 0.194 | 0.175 | 0.180 | 0.166 | 0.166 | 0.430 | 0.279 | 0.333 | 0.139 | 0.209 | $I_1$ |
| 0.142 | 0.138 | 0.146 | 0.050 | 0.070 | 0.146 | 0.060 | 0.096 | 0.074 | 0.065 | 0.065 | 0.194 | 0.207 | 0.284 | 0.166 | 0.211 | 0.027 | 0.067 | $I_2$ |
| 0.305 | 0.357 | 0.360 | 0.097 | 0.166 | 0.322 | 0.122 | 0.265 | 0.242 | 0.234 | 0.233 | 0.193 | 0.216 | 0.594 | 0.477 | 0.215 | 0.010 | 0.011 | $I_3$ |
| 0.176 | 0.494 | 0.460 | 0.030 | 0.048 | 0.135 | 0.044 | 0.075 | 0.048 | 0.032 | 0.034 | 0.082 | 0.081 | 0.416 | 0.233 | 0.188 | 0.005 | 0.005 | $I_4$ |
| 0.644 | 0.500 | 0.524 | 0.402 | 0.498 | 0.658 | 0.415 | 0.643 | 0.659 | 0.631 | 0.639 | 0.065 | 0.051 | 0.769 | 0.724 | 0.319 | 0.335 | 0.298 | $I_5$ |
| 0.432 | 0.661 | 0.669 | 0.372 | 0.341 | 0.202 | 0.351 | 0.145 | 0.138 | 0.126 | 0.121 | 0.052 | 0.042 | 0.595 | 0.316 | 0.300 | 0.306 | 0.286 | $I_6$ |
| 0.615 | 0.590 | 0.590 | 0.391 | 0.438 | 0.544 | 0.382 | 0.480 | 0.465 | 0.429 | 0.437 | 0.065 | 0.056 | 0.861 | 0.673 | 0.427 | 0.162 | 0.231 | $I_7$ |
| 0.570 | 0.496 | 0.511 | 0.303 | 0.395 | 0.614 | 0.330 | 0.572 | 0.562 | 0.541 | 0.546 | 0.109 | 0.095 | 0.821 | 0.619 | 0.399 | 0.128 | 0.128 | $I_8$ |
| 0.604 | 0.388 | 0.425 | 0.299 | 0.377 | 0.553 | 0.310 | 0.639 | 0.693 | 0.641 | 0.662 | 0.074 | 0.032 | 0.633 | 0.625 | 0.353 | 0.212 | 0.242 | $I_9$ |
| 0.647 | 0.375 | 0.436 | 0.351 | 0.397 | 0.479 | 0.364 | 0.556 | 0.616 | 0.549 | 0.571 | 0.071 | 0.026 | 0.554 | 0.577 | 0.425 | 0.232 | 0.309 | $I_{10}$ |
| 0.556 | 0.402 | 0.433 | 0.281 | 0.399 | 0.655 | 0.317 | 0.630 | 0.625 | 0.586 | 0.596 | 0.079 | 0.042 | 0.781 | 0.742 | 0.349 | 0.165 | 0.170 | $I_{11}$ |
| 0.703 | 0.450 | 0.549 | 0.892 | 0.779 | 0.181 | 0.841 | 0.123 | 0.152 | 0.139 | 0.120 | 0.021 | 0.007 | 0.294 | 0.290 | 0.312 | 0.013 | 0.145 | $I_{12}$ |
| 0.701 | 0.342 | 0.426 | 0.525 | 0.601 | 0.292 | 0.558 | 0.187 | 0.205 | 0.197 | 0.170 | 0.025 | 0.014 | 0.327 | 0.353 | 0.274 | 0.010 | 0.130 | $I_{13}$ |
| 0.835 | 0.393 | 0.491 | 0.639 | 0.737 | 0.462 | 0.686 | 0.363 | 0.386 | 0.378 | 0.351 | 0.029 | 0.015 | 0.420 | 0.527 | 0.278 | 0.028 | 0.148 | $I_{14}$ |
| 0.703 | 0.554 | 0.581 | 0.574 | 0.544 | 0.298 | 0.540 | 0.189 | 0.177 | 0.157 | 0.147 | 0.068 | 0.035 | 0.558 | 0.443 | 0.606 | 0.083 | 0.305 | $I_{15}$ |
| 0.499 | 0.566 | 0.531 | 0.261 | 0.215 | 0.122 | 0.218 | 0.062 | 0.042 | 0.037 | 0.034 | 0.067 | 0.032 | 0.468 | 0.261 | 0.640 | 0.035 | 0.244 | $I_{16}$ |
| 0.804 | 0.464 | 0.586 | 0.907 | 0.836 | 0.304 | 0.893 | 0.221 | 0.246 | 0.229 | 0.208 | 0.034 | 0.014 | 0.379 | 0.402 | 0.365 | 0.047 | 0.188 | $I_{17}$ |
| 1.000 | 0.491 | 0.590 | 0.757 | 0.835 | 0.614 | 0.791 | 0.591 | 0.643 | 0.631 | 0.616 | 0.053 | 0.028 | 0.532 | 0.712 | 0.434 | 0.072 | 0.251 | $I_{18}$ |
| 0.491 | 1.000 | 0.962 | 0.378 | 0.367 | 0.264 | 0.368 | 0.200 | 0.192 | 0.179 | 0.174 | 0.049 | 0.030 | 0.576 | 0.367 | 0.321 | 0.084 | 0.099 | $I_{19}$ |
| 0.590 | 0.962 | 1.000 | 0.507 | 0.496 | 0.299 | 0.512 | 0.235 | 0.238 | 0.219 | 0.209 | 0.075 | 0.053 | 0.570 | 0.412 | 0.328 | 0.102 | 0.127 | $I_{20}$ |
| 0.757 | 0.378 | 0.507 | 1.000 | 0.957 | 0.417 | 0.984 | 0.382 | 0.420 | 0.411 | 0.385 | 0.005 | 0.004 | 0.313 | 0.499 | 0.033 | 0.042 | 0.041 | $I_{21}$ |
| 0.835 | 0.367 | 0.496 | 0.957 | 1.000 | 0.602 | 0.974 | 0.555 | 0.589 | 0.591 | 0.563 | 0.008 | 0.007 | 0.411 | 0.679 | 0.036 | 0.039 | 0.037 | $I_{22}$ |
| 0.614 | 0.264 | 0.299 | 0.417 | 0.602 | 1.000 | 0.457 | 0.932 | 0.834 | 0.836 | 0.815 | 0.021 | 0.017 | 0.628 | 0.840 | 0.123 | 0.036 | 0.033 | $I_{23}$ |
| 0.791 | 0.368 | 0.512 | 0.984 | 0.974 | 0.457 | 1.000 | 0.401 | 0.443 | 0.437 | 0.410 | 0.006 | 0.005 | 0.340 | 0.556 | 0.033 | 0.034 | 0.034 | $I_{24}$ |
| 0.591 | 0.200 | 0.235 | 0.382 | 0.555 | 0.932 | 0.401 | 1.000 | 0.957 | 0.948 | 0.937 | 0.014 | 0.012 | 0.484 | 0.790 | 0.061 | 0.085 | 0.077 | $I_{25}$ |
| 0.643 | 0.192 | 0.238 | 0.420 | 0.589 | 0.834 | 0.443 | 0.957 | 1.000 | 0.992 | 0.991 | 0.010 | 0.009 | 0.432 | 0.804 | 0.021 | 0.113 | 0.103 | $I_{26}$ |
| 0.631 | 0.179 | 0.219 | 0.411 | 0.591 | 0.836 | 0.437 | 0.948 | 0.992 | 1.000 | 0.998 | 0.010 | 0.009 | 0.419 | 0.802 | 0.015 | 0.099 | 0.090 | $I_{27}$ |
| 0.616 | 0.174 | 0.209 | 0.385 | 0.563 | 0.815 | 0.410 | 0.937 | 0.991 | 0.998 | 1.000 | 0.010 | 0.008 | 0.414 | 0.796 | 0.015 | 0.107 | 0.097 | $I_{28}$ |
| 0.053 | 0.049 | 0.075 | 0.005 | 0.008 | 0.021 | 0.006 | 0.014 | 0.010 | 0.010 | 0.010 | 1.000 | 0.933 | 0.072 | 0.026 | 0.114 | 0.003 | 0.004 | $I_{29}$ |
| 0.028 | 0.030 | 0.053 | 0.004 | 0.007 | 0.017 | 0.005 | 0.012 | 0.009 | 0.009 | 0.008 | 0.933 | 1.000 | 0.055 | 0.020 | 0.055 | 0.002 | 0.002 | $I_{30}$ |
| 0.532 | 0.576 | 0.570 | 0.313 | 0.411 | 0.628 | 0.340 | 0.484 | 0.432 | 0.419 | 0.414 | 0.072 | 0.055 | 1.000 | 0.686 | 0.395 | 0.084 | 0.119 | $I_{31}$ |
| 0.712 | 0.367 | 0.412 | 0.499 | 0.679 | 0.840 | 0.556 | 0.790 | 0.804 | 0.802 | 0.796 | 0.026 | 0.020 | 0.686 | 1.000 | 0.134 | 0.077 | 0.074 | $I_{32}$ |
| 0.434 | 0.321 | 0.328 | 0.033 | 0.036 | 0.123 | 0.033 | 0.061 | 0.021 | 0.015 | 0.015 | 0.114 | 0.055 | 0.395 | 0.134 | 1.000 | 0.078 | 0.485 | $I_{33}$ |
| 0.072 | 0.084 | 0.102 | 0.042 | 0.039 | 0.036 | 0.034 | 0.085 | 0.113 | 0.099 | 0.107 | 0.003 | 0.002 | 0.084 | 0.077 | 0.078 | 1.000 | 0.780 | $I_{34}$ |
| 0.251 | 0.099 | 0.127 | 0.041 | 0.037 | 0.033 | 0.034 | 0.077 | 0.103 | 0.090 | 0.097 | 0.004 | 0.002 | 0.119 | 0.074 | 0.485 | 0.780 | 1.000 | $I_{35}$ |

Fig. 4B

IMAGE PROCESSING SYSTEM AND METHOD

BACKGROUND

A wide variety of printing technology is now available and widely used to print high quality color images, such as photographs and commercial printings. Such high quality color images may be printed using a variety of printing technology, including inkjet and laser jet printing technology. In order to improve printing capacity and productivity, multiple printers may be used for a single print job. Similarly, multiple print engines or printheads may be employed in a single printing device. This can provide a cost-efficient way to increase printing performance.

There can be printing consistency problems, however, with increasing productivity in this way. Due to inherent printer calibration errors, the colors printed by different printers, different print engines, or different printhead may exhibit visible hue shift. Consequently, when a series of print images, or a single "print job", with similar scenes are printed using multiple printers or using multiple printheads in a multiple printhead arrangement, the same input colors may be output by different engines or printheads thereby looking noticeably different.

Various calibration techniques may be employed so that visible hue shift can be minimized or at least reduced to some extent. However, it is very difficult to eliminate the hue shift problem completely, and such calibration techniques tend to be quite complex and use a considerable amount of system resources.

For these and other reasons, a need exists for the present invention.

SUMMARY

Exemplary embodiments of the present invention include a printing control system and method. The system includes a plurality of printing units, an image source, and a system processing unit. The image source provides a print job comprising a plurality of images to the system processing unit. The system processing unit receives the plurality of images in the print job from the image source, and calculates an image histogram for each image in the print job. The system processing unit then determines the similarity of the images in the print job by comparing the calculated histograms. The system processing unit then classifies the images into classes based on the comparison, and sends the classes of images to the printing units.

BRIEF DESCRIPTION OF THE DRAWINGS

FIGS. 4A and 4B are two portions of a chart showing the resulting values of a cross-correlation value calculation from one embodiment of the example illustrated in FIG. 3.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
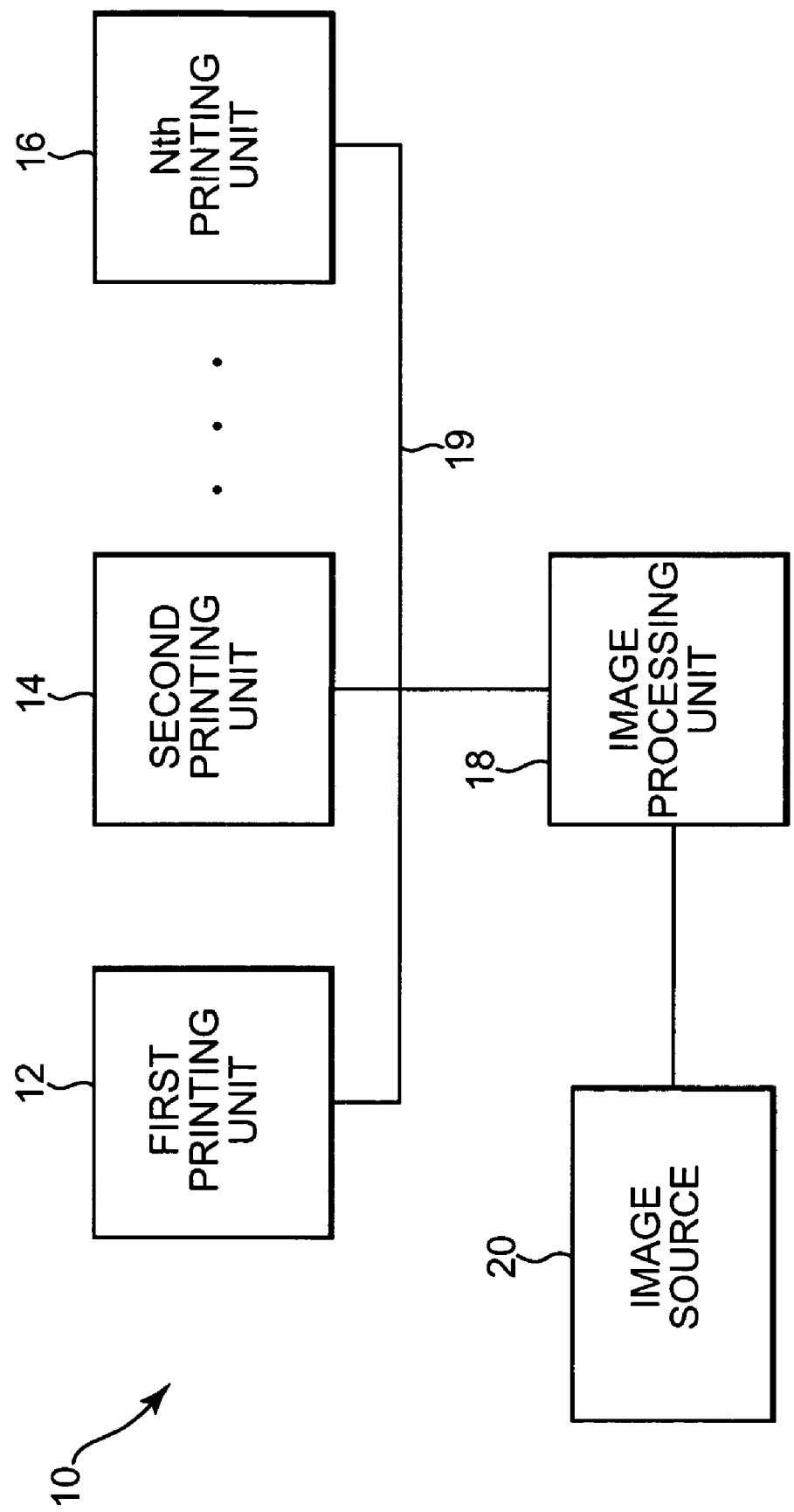
FIG. 1 is a block diagram illustrating one embodiment of a printing system according to the present invention.

FIG. 1 illustrates one embodiment of an image processing system 10 in accordance with the present invention. Image processing system 10 includes first printing unit 12, second printing unit 14, and Nth printing unit 16. Image processing unit 18 is operatively coupled to printing units 12, 14 and 16 via printing line 19. Image source 20 is operatively coupled to image processing unit 18.

In one embodiment, image processing system 10 utilizes a plurality of printing units 12, 14 and/or 16, in order to increase printing performance. Images received from image source 20 are processed by image processing unit 18, and then sent over printing line 19 to printing units 12, 14 and/or 16 for printing. Since more than one printing unit is used, printing output is increased. Image processing unit 18 includes hardware, software, firmware, or a combination of these. In one exemplary embodiment, image processing unit 18 includes a computer server or other microprocessor based system capable of performing a sequence of logic operations. In addition, image processing unit 18 can include a microprocessor embedded system/appliance incorporating tailored appliance hardware and/or dedicated single purpose hardware.

Printing units 12, 14 and 16 may comprise individual printers, or may reside in a single printer as separate print engines or as separate printheads. Printing units 12, 14, and 16 are defined to include any printing device capable of producing printed output, including textual and/or graphical images, on a print medium, such as paper, in response to electrical signals. Examples of such a printing device include a laser jet printer, inkjet printer, etc. Printing line 19 can be any means of electrically coupling printing units 12, 14 and 16 to image processing unit 18.

Image processing system 10 includes at least a first printing unit 12 and a second printing unit 14. Image processing system 10 may include no additional printing units or several additional printing units, as illustrated by Nth printer 16. By including at least two printing units, whether printers, print engines or printheads, a print job with a plurality of images can be split into at least two groups so that images of the print job can be printed in parallel on the printing units.

Image source 20 includes a plurality of images that together can be classified as a single print job. Typical print jobs might include sets of 12, 24, or 36 images. Such sets of images would be typical for a film roll. Although 12, 24 and 36 illustrate typical numbers of images in a print job, any number of images can make up a print job. In addition, the images may be presented in other media formats, such as digital images.

In accordance with the present invention, the images that make up a print job are sent from the image source 20 to image processing unit 18. Image processing unit 18 receives the print job from image source 20 and determines the number of printing units coupled to processing unit 18 over printing line 19. Image processing unit 18 considers the number of printing units operatively coupled to printing line 19 and the number of images in the print job, and determines which images in the print job are similar and sends those similar images to the same printing unit.

In some embodiments, images in a print job can be classified into several classes, wherein each class contains images that were taken in the same scene, with the same people, and/or under the same lighting conditions. Often, the only difference between these similar images may be the viewing angle, distance, or subject arrangement. If such similar images are sent to different printers, different print engines, or different printheads, color differences may be noticeable between the similar images. However, if such similar images are sent to the same printer, same print engine, or same printhead, consistent color reproduction will result. In this way, image processing unit 18 classifies similar images into the same class, and then sends all such images in that class to a single printing unit.

For example, a print job may contain a plurality of images, some of which are taken of a first scene and some of which were taken from a second scene. In one embodiment, if first printing unit 12 and second printing unit 14 are the only printing units coupled to image processing unit 18 over printer line 19, then image processing unit 18 classifies the print job received from image source 20 into two classes, a first class and a second class. Similar images from the first scene will be selected into the first class and similar images from the second scene will be selected into the second class. The first class is then sent to first printing unit 14 and the second class to second printing unit 14. In this way, all similar images will be printed on the same printing unit. In this way, image processing system 10 minimizes any perceived color inconsistency between similar images in a print job while increasing throughput relative to a system using only a single printing unit.

Figure 2:
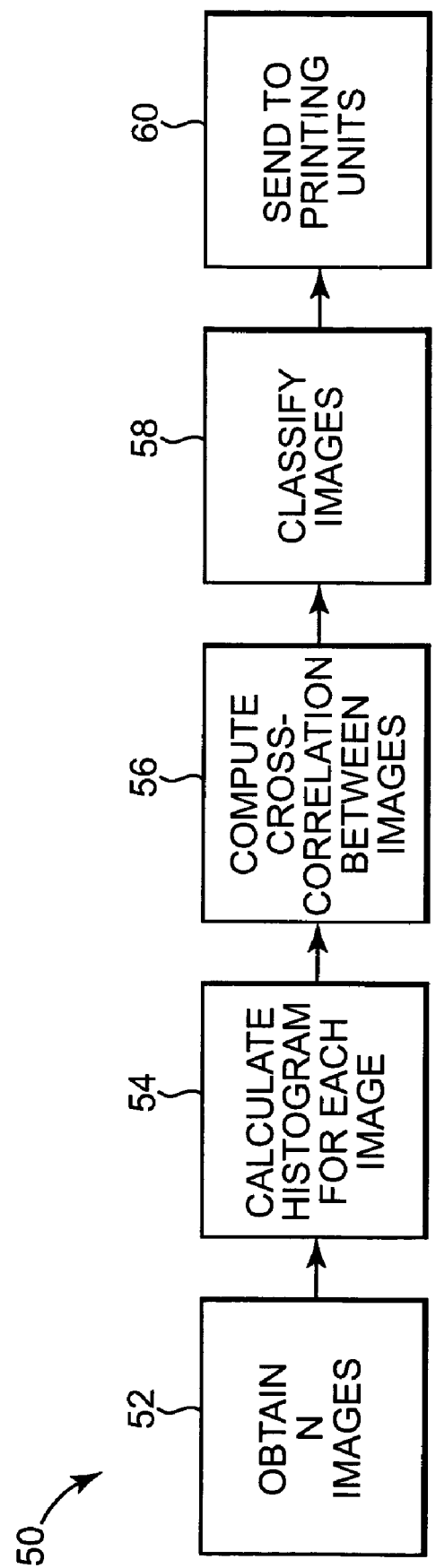
FIG. 2 is a flow diagram illustrating one embodiment of an image classification methodology according to the present invention.

In FIG. 2, a flow diagram illustrating one exemplary embodiment of an image classification methodology used by image processing unit 18 in accordance with the present invention is shown generally at 50. At 52, N images in a print job are obtained from image source 20. In one embodiment, N is in the range of 12 to 36 color images. For example, one typical application is to print the images from a roll of film of 24 or 36 photographs.

At 54, a color histogram is calculated for each of the obtained images. A color histogram is obtained by discretizing the image colors into a three-dimensional image array with multiple color bins in the three-dimensional array. Each bin in the array has a value that represents how many times each discrete color represented by that bin occurs in the image. In one embodiment, calculation of the color histogram entails storing valves in each color bin according to how many pixels of an image contain that color. Such color histograms are illustrated in *Color Indexing*, Swain and Ballard, International Journal of Computer Vision, 7(1), pp.11-32, 1991.

The image colors that are transformed to a common discrete color are usually thought of as being within the same three-dimensional histogram bin centered at that color. Since histograms record only color information, and do not relate to spatial information, they are largely invariant to translation and rotation about the viewing axis, and change only slightly under change of angle of view, change in scale, and occlusion. Each color histogram provides a statistical characterization for each color image. Essentially, in a discrete color space, a color histogram counts how much of each color occurs in the image. In one embodiment, a statistical characterization provided by the color histogram is used to measure the similarity between each pair of images.

Color histograms can be calculated in different color spaces. For example, color spaces such as RGB, CIELAB, or YCC can be used. RGB, or red, green, blue color space, describes color by its contribution from red, green and blue. CELAB color gets its name from a color space that uses three values to describe the precise three-dimensional location of a color inside a visible color space. L* represents the relative lightness, a* represents the relative redness-greenness, and b* represents the relative yellowness-blueness. Similarly, YCC represents a color in luminance and chrominance channels. For YCC, also sometimes referred to as YCbCr, Cb describes the blue and yellow channel and Cr described the red and green channel.

Generally, it is easier to distinguish black and white images from color images using YCC color space. In one embodiment of the present invention, YCC color space is used to calculate the color histogram of the images such that both color and black and white images can be easily adapted for use in the present invention. Those skilled in the art will see that the other various color spaces may be used consistently with the present invention.

In one embodiment, the resolution or accuracy of a color histogram is determined by the number of color bins used in these statistics. Since each pixel of an image has three components in the YCC color space, and each component has as many as 256 discrete levels, the number of bins required to represent an image, if each color of the spectrum is used, is extremely large. For example, where an image has 1,000×1,000 pixels, each of the 1,000,000 pixels in the image is represented by the three 256-level components in the YCC color space meaning that over 16 million bins would be needed for the color histogram. One technique for simplifying the calculation is to subdivide each of the YCC components into ranges, rather than 256 discrete levels. For example, the Y component could have 8 ranges of 1-32; 33-64; 65-96; 97-128; 129-160; 161-192; 193-224; and 225-256. In one embodiment of the present invention, the image may be digitized in the YCC color space to a size of 8×16×16. This corresponds to 2,048 color bins in total. Although more or less bins can be used consistently with the present invention, this combination is a good compromise between statistical accuracy and computational complexity for one embodiment of the present invention.

At 56, images are compared by computing a cross-correlation value between each of the images using the color histogram. In one embodiment, a cross-correlation value is calculated using the following function:

$$C(i, j) = \frac{\sum_{k=1}^{n} H_i(k) H_j(k)}{\sqrt{\sum_{k=1}^{n} H_j(k)^2} \sqrt{\sum_{k=1}^{n} H_j(k)^2}} \qquad \text{Equation 1}$$

In Equation 1, $C(i, j)$ is the cross-correlation value between two color histograms, where $H_i$ and $H_j$ are the color histograms for respective images i and j, k is the bin index, and n is the total number of bins.

Comparing the images using the calculated cross-correlation value has the advantage of producing a normalized output, such that each comparison will produce a 0 (if the images are completely different), a 1 (if the images are the same), or a number that is between 0 and 1 (depending on the similarity of these images). As indicated, when the two images, and thus the two color histograms, are the same, the cross-correlation value is 1. This cross-correlation value will decrease when the similarity between the two images, and thus between the two color histograms, decreases. When two images are completely different, the cross-correlation value is 0. In addition, the cross-correlation function produces a result that is invariant to the scale change of the image. Even where two images have different sizes, they still can be compared using the cross-correlation value to produce a result indicative of the similarity between images.

At 58 the images are classified into final classes based on the calculated cross-correlation value. The calculated cross-correlation value, and thus the image classification are related to, and based upon, the similarity of the images. In one embodiment, since image processing unit 18 knows the number of printing units connected on printing line 19, image processing unit 18 can classify the images into the same number of final classes as there are printing units in the system 10. In this way, the speed of system 10 is maximized by utilizing each of the printing units to print the various images of the print job. In one embodiment, the classification of images is done such that all similar images are placed in the same final class. Although the number of final classes does not have to be the same as the number of printing units in the system, system efficiency is maximized when they are the same number.

At 60, once the images are placed in the final classes, the images are sent to the printing units for printing. In one exemplary embodiment, there are three final classes and three printing units in the system, such that each class is sent to its own unique printing unit.

Figure 3:
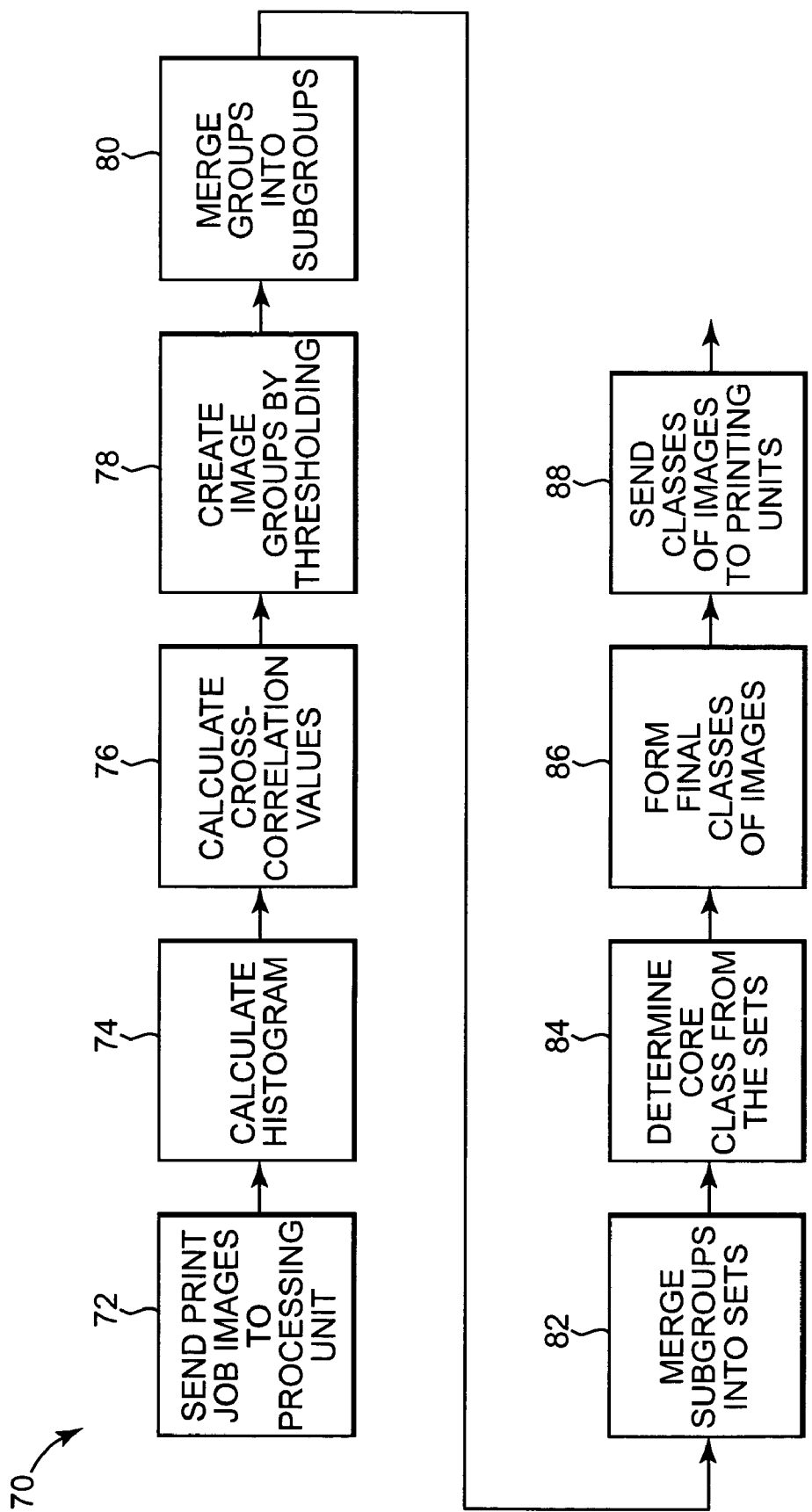
FIG. 3 is a flow diagram illustrating an example image classification with a printing system according to one embodiment of the present invention.

In FIG. 3, a flow diagram illustrating one exemplary embodiment of a printing system with image classification according to the present invention is shown generally at 70. Specifically, further details of the method for classifying images, as in 58 of FIG. 2, are also illustrated by this example.

In one exemplary embodiment, as illustrated in FIGS. 4A-4B, a print job includes 35 color images, identified as $I_1$, $I_2$, $I_3$, $I_4$, $I_5$, $I_6$, $I_7$, $I_8$, $I_9$, $I_{10}$, $I_{11}$, $I_{12}$, $I_{13}$, $I_{14}$, $I_{15}$, $I_{16}$, $I_{19}$, $I_{17}$, $I_{18}$, $I_{19}$, $I_{20}$, $I_{21}$, $I_{22}$, $I_{23}$ $I_{24}$, $I_{25}$, $I_{26}$, $I_{27}$, $I_{28}$, $I_{29}$, $I_{30}$, $I_{31}$, $I_{32}$, $I_{33}$, $I_{34}$, and $I_{35}$. At 72 of FIG. 3, the images in this print job are sent to image processing unit 18 so that they can be classified in accordance with the present invention. In this example, $I_1$ and $I_2$, are images of a very similar scene; $I_3$ and $I_4$ are images from a related scene; $I_5$, $I_6$, $I_7$, $I_8$, $I_9$ $I_{10}$, and $I_{11}$ are images of a similar scene with varying subjects; $I_{12}$, $I_{13}$, $I_{14}$, $I_{15}$, $I_{16}$, $I_{17}$ and $I_{18}$ are images of the same subject and scene with variations in lighting; $I_{19}$ and $I_{20}$ are images of a very similar scene; $I_{21}$, $I_{22}$, $I_{23}$ $I_{24}$, $I_{25}$, $I_{26}$, $I_{27}$, and $I_{28}$ are images of the same subject and scene with variations in lighting; $I_{29}$ and $I_{30}$ are images of a very similar scene; $I_{31}$ and $I_{32}$ are images of the same subject and scene with variations in lighting; and finally, and $I_{33}$, $I_{34}$, and $I_{35}$ are images unrelated to each other and unrelated to any of the other images.

As indicated previously, printing units 12, 14 and 16 may be individual printers, or multiple print engines or printheads within one or more printers. In one exemplary embodiment, image processing unit 18 receives images $I_1$-$I_{35}$ and classifies the images based on calculated color histograms in order to sort the images into two classes, one to be sent to first printing unit 12 and the other to be sent to second printing unit 14. Accordingly, similar images will be sent to the same printing unit thereby minimizing or eliminating any perceived hue shifts between images.

At 74, once the images are received by image processing unit 18, a color histogram is calculated for each image. In one embodiment, the color histogram for each image is calculated in the YCC color space to a size of 8×16×16. This corresponds to 2,048 color bins for each image. Again, although more or less bins can be used consistently with the present invention, this combination is a good compromise between statistical accuracy and computational complexity for one embodiment of the present invention. Furthermore, a black and white histogram could also be calculated consistently with the present invention, and would require even less bins.

Once the color histogram is calculated for each image $I_1$-$I_{35}$, at 76 a cross-correlation value is calculated between each of the images using the calculated color histograms for each image. In one embodiment, Equation 1 above is used to calculate the cross-correlation value between the histograms. Each resulting value will be normalized such that it is between 0 and 1, is 0, or is 1. One exemplary embodiment, the total number of bins is 2,048 relating to the 8×16×16 color space. The results of the calculation of the cross-correlation value between the histograms of each of the images of the exemplary embodiment are illustrated in FIGS. 4A-4B.

At 78, groups of images are created by thresholding. Specifically, a group is created for each image in the print job and a threshold is applied such that images over the threshold are added to the group. More specifically, a group is created for each image N, in this example $I_1$-$I_{35}$, and each image is identified as a home image, such that there are groups 1 through 35 each having a home image. In other words, $I_1$ is the home image for group 1, $I_2$ is the home image for group 2, and so on. Then, images are added to each group based on whether an image, when cross-correlated with the home image for the group, produces a cross-correlation value greater than a selected threshold value. When an image produces a value greater than the threshold, it is added to the group, and when it produces a value less than the threshold, it is not added to the group.

In one exemplary embodiment, the threshold value is 0.85. The threshold value can be raised or lowered to decrease or increase the number of images that will be added to the various groups, thereby adjusting the classification of the images in the system. In some embodiments, a threshold value of about 0.8 to about 0.95 is effective at sorting the images.

In one exemplary embodiment, creating image groups by thresholding at 78 with the values illustrated in FIGS. 4A-4B produces the following groups of images:

Group 1: $I_1$, $I_2$
Group 2: $I_2$, $I_1$
Group 3: $I_3$
Group 4: $I_4$
Group 5: $I_5$, $_{I8}$, $I_{11}$
Group 6: $I_6$
Group 7: $I_7$, $I_{31}$
Group 8: $I_8$, $I_5$, $I_9$, $I_{11}$
Group 9: $I_9$, $I_8$, $I_{10}$, $I_{11}$
Group 10: $I_{10}$, $I_9$, $I_{11}$
Group 11: $I_{11}$, $I_5$, $I_8$, $I_9$, $I_{10}$
Group 12: $I_{12}$, $I_{17}$, $I_{21}$
Group 13: $I_{13}$, $I_{14}$
Group 14: $I_{14}$, $I_{13}$
Group 15: $I_{15}$
Group 16: $I_{16}$
Group 17: $I_{17}$, $I_{12}$, $I_{21}$, $I_{24}$
Group 18: $I_{18}$
Group 19: $I_{19}$, $I_{20}$
Group 20: $I_{20}$, $I_{19}$
Group 21: $I_{21}$, $I_{12}$, $I_{17}$, $I_{22}$, $I_{24}$
Group 22: $I_{22}$, $I_{21}$, $I_{24}$
Group 23: $I_{23}$, $I_{25}$
Group 24: $I_{24}$, $I_{17}$, $I_{21}$, $I_{22}$
Group 25: $I_{25}$, $I_{23}$, $I_{26}$, $I_{27}$, $I_{28}$
Group 26: $I_{26}$, $I_{25}$, $I_{27}$, $I_{28}$
Group 27: $I_{27}$, $I_{25}$, $I_{26}$, $I_{28}$
Group 28: $I_{28}$, $I_{25}$, $I_{26}$, $I_{27}$
Group 29: $I_{29}$, $I_{30}$ Group 30: $I_{30}$, $I_{29}$
Group 31: $I_{31}$, $I_7$
Group 32: $I_{32}$
Group 33: $I_{33}$
Group 34: $I_{34}$
Group 35: $I_{35}$ In this embodiment, since the cross-correlation value of the color histogram of $I_1$ and the color histogram of $I_2$ is 0.862, and this value is greater than the threshold value of 0.85, $I_2$ is added to group 1, and for the same reason, $I_1$ is added to group 2. This same methodology is applied to each of the groups 1 through 35 thereby producing the above resulting group members. As will be evident, there can be images that are members to more than one group while creating image groups at 78.

At 80, those groups of images formed at 78 that have the same members are merged to form subgroups of images. Where a group has no members in common with another group, it is not merged with another group and simply becomes a new subgroup by itself. For example, in the exemplary embodiment presented above, groups 3 and 4 have members $I_3$ and $I_4$ that are not in common with any other groups.

Where a group does have members in common with another group, either the two groups are merged to form a single new subgroup or the common members of the groups are distributed to one of the groups and the new combination of members becomes a new subgroup. More specifically, if half or more than half of the members of two groups are common to both groups, then these two groups are merged to form a single subgroup. In order to determine whether half or more than half of the members of two groups are common to both groups, the group with the smaller number of members is identified and its number of members is the member count. The number of members that are common to both groups is identified as the common member number.

In one embodiment, if the common member number is greater than or equal to one-half of the member count, then half or more than half of the members of two groups are common to both groups, and these two groups are merged to form a single subgroup. For example, in the exemplary embodiment presented above, Group 5 and Group 8 have two members in common: $I_5$ and $I_8$. Since Group 5 is smaller, the member count is three. Since one-half of the common member count (2) is greater than one-half of the member count, (1.5), the groups are merged to form a single group.

In one embodiment, if less than half of the members of two groups are common to both groups, then a computation of an average cross-correlation value of each common member is made with both groups to determine the group to which the member belongs. The member is added to the group with which it has the higher average cross-correlation value. In one embodiment, the average cross-correlation value of a member to a group is calculated using the following equation:

$$A_m = \frac{1}{M}\sum_{k=1}^{M} C(i,k) \qquad \text{Equation 2}$$

In Equation 2, $A_m$ is the average cross-correlation value between a member and a group, where $C(i,k)$ is the cross-correlation value between image i and image k, and M is the number of images in the group.

In the exemplary embodiment presented above, merging the groups into subgroups at 80 results in the following subgroups of images:
Subgroup 1: $I_1$, $I_2$
Subgroup 2: $I_3$
Subgroup 3: $I_4$
Subgroup 4: $I_6$
Subgroup 5: $I_5$, $I_8$, $I_9$, $I_{10}$, $I_{11}$
Subgroup 6: $I_{13}$, $I_{14}$
Subgroup 7: $I_{15}$
Subgroup 8: $I_{16}$
Subgroup 9: $I_{18}$
Subgroup 10: $I_{19}$, $I_{20}$
Subgroup 11: $I_{12}$, $I_{17}$, $I_{21}$, $I_{22}$, $I_{24}$
Subgroup 12: $I_{23}$, $I_{25}$, $I_{26}$, $I_{27}$, $I_{28}$
Subgroup 13: $I_{29}$, $I_{30}$
Subgroup 14: $I_7$, $I_{31}$
Subgroup 15: $I_{32}$
Subgroup 16: $I_{33}$
Subgroup 17: $I_{34}$
Subgroup 18: $I_{35}$ In one embodiment, after merging the groups into subgroups at 80, each image will belong to one subgroup.

At 82, subgroups of images with the highest similarity are merged into sets of images. In one embodiment, the similarity between each of the subgroups is measured by averaging the cross-correlation values between all members of one subgroup and all members of the other subgroup. In one embodiment, the similarity between subgroups is calculated using the following equation:

$$A_c = \frac{1}{M*L}\sum_{i=1}^{M}\sum_{j=1}^{L} C(i,j) \qquad \text{Equation 3}$$

In Equation 3, $A_c$ is the average cross-correlation value between two subgroups, where $C(i,j)$ is the cross-correlation value between image i and image j, and M and L are the number of images in the subgroups, respectively. Using Equation 3, the average cross-correlation value between each pair of subgroups is calculated. At 82, the two subgroups with the highest average cross-correlation value are selected, and merged together to form a new single set. In one embodiment, this merger of subgroups into sets is repeated until the total number of sets and remaining subgroups is equal to a limiting number. Any remaining subgroups become sets once the limiting number of sets and subgroups is the limiting number. This limiting number can be adjusted based on the particular application. In one exemplary embodiment, the limiting number for sets is 12. Thus, the most similar subgroups are merged 6 times such that the following 12 sets of images remain:
Set 1: $I_1$, $I_2$
Set 2: $I_3$
Set 3: $I_4$
Set 4: $I_{13}$, $I_{14}$
Set 5: $I_{15}$, $I_{16}$
Set 6: $I_{19}$, $I_{20}$, $I_6$
Set 7: $I_{12}$, $I_{17}$, $I_{21}$, $I_{22}$, $I_{24}$, $I_{18}$
Set 8: $I_{29}$, $I_{30}$
Set 9: $I_7$, $I_{31}$, $I_5$, $I_8$, $I_9$, $I_{10}$, $I_{11}$
Set 10: $I_{32}$, $I_{23}$, $I_{25}$, $I_{26}$, $I_{27}$, $I_{28}$
Set 11: $I_{33}$
Set 12: $I_{34}$, $I_{35}$ After merging the subgroups into sets, the number of sets of images will be reduced down to the limiting number, which in the example is 12. If the limiting number were lower, merging the subgroups into sets at 82 would be further repeated until the combination of subgroups and sets equal the limiting number. Similarly, if the limiting number were higher, the process of step 82 would not be repeated as many times such that the combination of subgroups and sets equal the limiting number.

At 84, a core class of images is determined from the various remaining sets of images for each final class of images. In the exemplary embodiment presented above, since two printing units are known to be coupled to the system, two final classes should be formed in order to maximize system efficiency (If there were three printing units in the system, three final classes would be formed in order to maximize system efficiency).

In one exemplary embodiment, to select the two core classes of images for the two final classes of images, the two sets of images with the greatest number of images are selected as the core classes. Where two sets of images are tied with the most members, the first occurring set is selected. Thus, in the exemplary embodiment presented above, the core classes of images are:

Core Class 1: $I_7, I_{31}, I_5, I_8, I_9, I_{10}, I_{11}$
Core Class 2: $I_{12}, I_{17}, I_{21}, I_{22}, I_{24}, I_{18}$ At 86, final classes of images are formed from the core classes of images. In one exemplary embodiment, each remaining set of images is merged with the core class of images with which it has higher similarity. In one embodiment, similarity between each of the remaining sets and the core classes is determined with Equation 3 above. In Equation 3, $A_c$ is the average cross-correlation value between the set and the core class, where $C(i,j)$ is the cross-correlation value between image i and image j, and M and L are the number of images in the set and the core class, respectively. Each remaining set is compared to each core class to determine to which core class it is more similar, and then is merged into that core class such that the merged combination then becomes the new core class. In other words, in one embodiment, forming the final classes of images at 86 is progressive, not static, such that the core classes get larger as each remaining set is merged into one of the core classes. The sets are taken in order until each of the remaining sets has been merged into a core class. Thus, in the exemplary embodiment presented above, once the similar sets are merged into the core classes, the two final classes of images are:

First Final Class: $I_1, I_2, I_5, I_6, I_7, I_8, I_9, I_{10}, I_{11}, I_{19}, I_{20}, I_{23}, I_{25}, I_{26}, I_{27}, I_{28}, I_{31}$, and $I_{32}$
Second Final Class: $I_3, I_4, I_{12}, I_{13}, I_{14}, I_{15}, I_{16}, I_{17}, I_{18}, I_{21}, I_{22}, I_{24}, I_{29}, I_{30}, I_{33}, I_{34}$, and $I_{35}$ Finally, At 88, the final classes of images are sent to the printing unit. In the exemplary embodiment presented above, the images of the first final class are sent to the first printing unit 12 and the images of the second final class are sent to the second printing unit. As seen from the example, those images with similar scenes are printed on the same printing unit thereby minimizing any perceived color inconsistency between similar images in the print job while increasing throughput relative to a system using only a single printing unit.

In the exemplary embodiment presented above, a limiting number of 12 was used in at 82 of FIG. 3 to merge the subgroups of images into sets of images. As indicated, this limiting number can be adjusted based on the particular application. In some embodiments, the limiting number may be 4 to 6 times the number of final classes. Since the number of final classes was 2 in the example, the limiting number was set to 6 times the number of final classes or 12.

In the exemplary embodiment presented above, the similar images were in relatively small sets relative to the overall number of images. In other exemplary embodiments, there may be only 10 total images in a print job with 8 of the images being of a similar scene and two of the images being of a different scene. In this case, if there are two printing units and similar the images are printed on the same printing unit, eight images would be classified in a first class and printed on one printing unit, and two images would be classified in a second class and printed on the other printing unit. This classification, however, may not maximize the throughput of the system. Since eight images will be printed with one printing unit and two images will be printed with the other printing unit, perceived color consistency between similar images, however, will be improved.

One skilled in the art will understand that a variety of equivalent implementations may be substituted for the embodiments described without departing from the scope of the present invention. For example, the number of printing units in the system may be increased to further increase the printing output of the system. In this case, at 84 of FIG. 3, a greater number of core classes may be selected such that there can be a greater number of final classes of images. Thus, similar images will still be classified in the same final class, but a greater number of classes can be sent to the increased number of printing units.

In addition, in situations where it is known that the number of printing units is increased, the limiting number of sets at 82 of FIG. 3 may be increased to ensure that there are enough sets to create sufficient core classes to maximize the use of all the printing units. Similarly, adjusting the threshold number at 78 of FIG. 3 can help ensure the appropriate number of core classes are available to maximize the use of all the printing units.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printing control system, comprising:
   a plurality of printing units;
   an image source providing a print job comprising a plurality of images; and
   a system processing unit, wherein the system processing unit is configured to receive the plurality of images in the print job from the image source, calculate an image histogram for each image in the print job, determine a similarity of the images in the print job by comparing the calculated histograms, classify the images into at least a first and a second class based on the similarity of the histograms, and send each of the images of the first class to a respective one of the printing units.

2. The system of claim 1, wherein the system processing unit is adapted to compare the calculated histograms by calculating cross-correlation values between the images in the print job based on the histograms.

3. The system of claim 2, wherein the plurality of printing units includes at least a first printing unit and a second printing unit, wherein the number of classes equals the number of printing units and includes at least the first class and the second class, and wherein the first class of images is printed on the first printing unit and the second class of images is printed on the second printing unit.

4. The system of claim 2, wherein the cross-correlation values between the images in the print job are normalized and have a value of one of 0, 1, and between 0 and 1, wherein the value is 0 when the images are most dissimilar and is 1 when the images are most similar.

5. The system of claim 2, wherein the histogram for each image includes a multitude of bins each representing colors, and wherein calculating the cross-correlation values includes calculating a normalized summation of the product of each color bin for the multitude of bins.

6. The system of claim 2, wherein the system processing unit is adapted to classify the images based on the comparison of the calculated histograms by forming a group for each of the images in the print job, and then adding other images to the group as image members of the group when the cross-correlation value between respective images is greater than a threshold value.

7. The system of claim 6, wherein the threshold value is between approximately 0.8 and approximately 0.95.

8. The system of claim 6, wherein the system processing unit is adapted to classify the images based on the comparison of the calculated histograms by also forming subgroups from the groups by regrouping groups that have image members in common.

9. The system of claim 8, wherein the system processing unit is adapted to merge groups that have at least half of the image members in common into subgroups.

10. The system of claim 8, wherein the system processing unit is adapted to regroup image members from groups having less than half of the image members in common into subgroups by computing an average cross-correlation value of each image member of the groups with each group to determine the group to which the image member belongs.

11. The system of claim 8, wherein the system processing unit is adapted to classify the images based on the comparison of the calculated histograms by also forming sets from the subgroups by merging subgroups that have similar image members.

12. The system of claim 11, wherein the system processing unit is adapted to classify the images based on the comparison of the calculated histograms by also forming core classes from the sets by selecting the sets with the greatest number of image members as the core classes.

13. The system of claim 12, wherein the number of core classes is equal to the number of printing units in the system.

14. The system of claim 12, wherein the system processing unit is adapted to classify the images based on the comparison of the calculated histograms by also forming final classes from the core classes by adding any remaining image members of the sets to the core classes with which the sets are most similar.

15. The system of claim 14, wherein the system processing unit is adapted to determine which sets are most similar to which of the core classes by a progressive process wherein the number of image members in a core class increases each time a set is merged into one of the core classes.

16. The system of claim 1, wherein the printing units are each individual printers operatively coupled to the system processing unit.

17. The system of claim 1, wherein the printing units are each print engines contained in a single printer.

18. The system of claim 1, wherein the printing units are each printheads contained in a single printer.

19. A method of processing a print job including multiple images with a printing system including multiple printing units, comprising:
identifying the number of printing units in the system, the system including at least a first printing unit and a second printing unit;
calculating a histogram for each image in the print job;
comparing the histograms of the images in the print job to determine similarity between the images;
grouping the images into groups based on the similarity of the comparisons of the histograms;
sorting the images in the groups into classes, including at least a first class and a second class; and
sending the images to the printing units for printing, including sending the images from the first class to the first printing unit and sending the images from the second class to the second printing unit.

20. The method of claim 19, wherein comparing the histograms of the images includes calculating cross-correlation values between the images in the print job based on the histograms.

21. The method of claim 20, wherein the histogram for each image includes a multitude of bins each representing colors, and wherein calculating the cross-correlation values includes calculating a normalized summation of the product of each color bin for the multitude of bins.

22. The method of claim 20, wherein grouping the images into groups includes forming a group for each of the images in the print job, and then adding other images to the group as image members of the group when the cross-correlation value between respective images is greater than a threshold value.

23. The method of claim 22, wherein sorting the images in the groups into classes includes forming subgroups from the groups by merging groups that have image members in common.

24. The method of claim 23, wherein forming subgroups from the groups includes merging into respective subgroups groups that have at least half of the image members in common.

25. The method of claim 23, wherein forming subgroups from the groups includes sorting into respective subgroups image members from groups that have less than half of the image members in common by computing an average cross-correlation value of each image member of the groups with each group to determine the group to which the image member belongs.

26. The method of claim 23, wherein sorting the images in the groups into classes further includes forming sets from the subgroups by merging subgroups that have similar image members.

27. The method of claim 26, wherein sorting the images in the groups into classes further includes forming core classes from the sets by selecting the sets with the greatest number of image members as the core classes.

28. The method of claim 27, wherein sorting the images in the groups into classes further includes forming the classes from the core classes by adding any remaining image members of the sets to the core classes with which the sets are most similar.

29. A printing control system, comprising:
a plurality of printing units;
an image source providing a print job comprising a plurality of images; and
processing means for receiving the plurality of images in the print job from the image source, for calculating an image histogram for each image in the print job, for comparing the calculated histograms and determining a similarity of the images in the print job, for classifying the images into classes based on the similarity of the comparison, and for sending each of the images in a class to a respective one of the printing units.

30. The system of claim 29, wherein the processing means compares the calculated histograms by calculating cross-correlation values between the images in the print job based on the histograms.

31. The system of claim 30, wherein the plurality of printing units includes at least a first printing unit and a second printing unit, wherein the number of classes equals the number of printing units and includes at least a first class and a second class, and wherein the first class of images is printed on the first printing unit and the second class of images is printed on the second printing unit.

32. The system of claim 30, wherein the histogram for each image includes a multitude of bins each representing colors, and wherein calculating the cross-correlation values includes calculating a normalized summation of the product of each color bin for the multitude of bins.

33. The system of claim 30, wherein the processing means classifies the images based on the comparison of the calculated histograms by forming a group for each of the images in the print job, and then adding other images to the group as image members of the group when the cross-correlation value between respective images is greater than a threshold value.

34. The system of claim 33, wherein the processing means classifies the images based on the comparison of the calculated histograms by also forming subgroups from the groups by regrouping groups that have image members in common.

35. The system of claim 34, wherein the processing means merges groups that have at least half of the image members in common into subgroups.

36. The system of claim 34, wherein the processing means regroups image members from groups having less than half of the image members in common into subgroups by computing an average cross-correlation value of each image member of the groups with each group to determine the group to which the image member belongs.

37. The system of claim 34, wherein the processing means classifies the images based on the comparison of the calculated histograms by also forming sets from the subgroups by merging subgroups that have similar image members.

38. The system of claim 37, wherein the processing means classifies the images based on the comparison of the calculated histograms by also forming core classes from the sets by selecting the sets with the greatest number of image members as the core classes.

39. The system of claim 38, wherein the processing means classifies the images based on the comparison of the calculated histograms by also forming final classes from the core classes by adding any remaining image members of the sets to the core classes with which the sets are most similar.

\* \* \* \* \*